United States Patent [19]
Ison et al.

[11] 4,449,480
[45] May 22, 1984

[54] CULTURE OF FRESHWATER MUSSEL GLOCHIDIA IN AN ARTIFICIAL HABITAT UTILIZING COMPLEX LIQUID GROWTH MEDIA

[75] Inventors: Billy G. Ison, Killen, Ala.; Robert G. Hudson, Clinton, S.C.

[73] Assignee: Tennessee Valley Authority, Muscle Shoals, Ala.

[21] Appl. No.: 437,817

[22] Filed: Oct. 29, 1982

Related U.S. Application Data

[63] Continuation-in-part of Ser. No. 369,691, Apr. 19, 1982, abandoned, which is a continuation of Ser. No. 328,307, Dec. 7, 1981, abandoned.

[51] Int. Cl.³ ............................................. A01K 61/00
[52] U.S. Cl. ...................................................... 119/4
[58] Field of Search ............................................ 119/4

[56] References Cited

U.S. PATENT DOCUMENTS 4,198,926 4/1980 Morse ...................................... 119/4
4,348,983 9/1982 Cooper .................................... 119/4

Primary Examiner—Hugh R. Chamblee
Attorney, Agent, or Firm—Robert A. Petrusek

[57] ABSTRACT

A proess, and a composition of matter utilized therein, to obtain transformation of the glochidia of freshwater mussels to the juvenile stage. In nature, glochidia normally transform while as parasites on fish. The instant artificial process involves the use of cell culture and bacteriological techniques to best assure environmental integrity during the protracted culture period. The composition of the media includes a combination of the blood plasma of fish and commonly available tissue culture fluids and inorganic salts. A nonspecific component of fish blood plasma in combination with the media, supra, was determined to be essential for glochidial transformation to juveniles.

18 Claims, No Drawings

CULTURE OF FRESHWATER MUSSEL GLOCHIDIA IN AN ARTIFICIAL HABITAT UTILIZING COMPLEX LIQUID GROWTH MEDIA

The invention herein described may be used by or for the Government for governmental purposes without the payment to us of any royalty therefor.

This application is a continuation-in-part of application Ser. No. 369,691, filed Apr. 19, 1982, which, in turn, is a continuation of application Ser. No. 328,307, filed Dec. 7, 1981, both now abandoned, Billy G. Isom and Robert G. Hudson, for CULTURE OF FRESHWATER MUSSEL GLOCHIDIA IN AN ARTIFICIAL HABITAT UTILIZING COMPLEX LIQUID GROWTH MEDIA.

FIELD OF INVENTION

The present invention relates to a method and composition of matter essential to the transformation of the glochidia of freshwater mussels to the juvenile stage. More particularly, the present invention relates to a process whereby the normal period of host specific parasitism on fish is reproduced in an artificial habitat, which is essential to commercial or conservation management of some species, especially where the specific fish host requirement is unknown.

BACKGROUND OF THE INVENTION

Due in part to the complex life-cycle of freshwater mussels usually involving a parasitic stage on fish host and to unknown environmental or habitat requirements, many freshwater mussel species have been recognized as declining in numbers and/or extirpated from historical habitats. Therefore, approximately 15 percent of all animal species recognized by law as endangered include various species of freshwater mussels.

Initiation of research leading to the present invention was for the specific purpose of developing a culture medium for use in conservation of endangered freshwater mussels. However, the instant invention is highly relevant to management and conservation of commercial freshwater mussel species, shells of which were used historically for making buttons and presently for making nuclei for cultured pearls.

Historically, Ellis et al (1926, *Science*, Vol. 54, No. 1667, pages 579-580; and 1929 *Trans. Amer. Fish Soc.*, Vol. 59, pages 217-223) claimed to have obtained transformation of freshwater mussel glochidia to young adult mussels; however, if they did, neither the process nor the composition of matter was ever published to the extent their work could be reproduced. The research described herein utilized processes and composition of matter unavailable during Ellis's research and certainly during the period of their purported successes.

Since each gravid mussel may have tens of thousands of glochidia, it is obvious that if they could be cultured artificially there would be significant commercial and conservation potential. There appear to be no historical data base other than the claims of Ellis et al, supra, relevant to the present invention.

Since glochidia parasitizing fish are known to obtain some essential stimulus and nourishment from the fish blood plasma in order to transform from the larval or glochidial stage to the young adult stage, it was thought that the best chance of artificial habitat culture was to simulate this complex chemical environment in the artificial habitat. Thus, a complex medium was developed which, when combined with blood plasma of fish in a process, was found to be essential for glochidial transformation to the juvenile stage.

PRIOR ART

Biologists have long recognized the parasitic relationship between freshwater mussels and their specific fish host. However, researchers in this area apparently are not aware of any prior art specifically related to transformation of glochidia of freshwater mussels by artificial means.

OBJECTS OF THE INVENTION

It is therefore an object of the present invention to develop a method or process whereby glochidia of freshwater mussels can be handled during an extended period necessary for their transformation to juvenile mussels.

Another object of the present invention is to report development of a composition of matter essential to the transformation of freshwater mussel glochidia under artificial conditions.

Still further and more general objects of the present invention will appear from the more detailed description set forth in the following description and examples.

ADVANTAGES OF THE INVENTION

A primary advantage of the present invention over use of natural means of mussel propagation is that a mussel species host determination is unnecessary. Identification of natural mussel fish host is made difficult, not only by the diversity of fish fauna that have to be tested, but also the host identification is complicated by the fact that a true host may be rejected due to natural immune responses. The present invention obviates this problem since there can be no immune response development in the artificial cultures.

Another advantage of the present invention is that a colony of very rare or endangered mussels could be developed as a base for use in ultimate discovery of a host fish for natural propagation. The invention has potential application to management of commercial mussel species used in pearl culture.

Still another potential advantage of the present invention is that unlike in the vissitudes of nature, where most glochidia are thought to die, thousands of glochidia released by a single female mussel could be grown for ultimate release or management.

DESCRIPTION OF THE INVENTION

The present invention will be better understood from a consideration of the following description taken in connection with the accompanying tabulated data of the essential compositions of matter and the various steps of the process used in carrying out the invention.

Composition of Matter Used to Transform Freshwater Mussel Glochidia to Juveniles

Complex Artificial Growth Medium (CAGM)

The complex artificial growth media, or CAGM, as it will hereafter be referred to for the sake of convenience, comprises (1) inorganic salts; (2) amino acids grouped as essential amino acids and nonessential amino acids; (3) vitamins; and (4) glucose.

The composition of inorganic salts used in the CAGM is a modification of the "unionid ringers fluid" introduced by Ellis, Merrick, and Ellis (1930, Bulletin Bur. Fish, Vol. 56, pages 509–542) and is found in table I below. Essential modification of the fluid included deletion of dibasic sodium phosphate, and addition of 2.2 gm NaCHO3 per 1000 milliliters of unionid ringers fluid.

TABLE 1

| | Inorganic Salts | |
|---|---|---|
| | Concentration (mg/l) | |
| Compound | Limits | Preferred |
| CaCl2 | 600–1400 | 1200 |
| MgCl2.6H2O | 500–1200 | 1000 |
| NaCl | 700–1700 | 1530 |
| KCl | 50–125 | 99 |
| NaHCO3 | 1100–2400 | 2200 |

The amino acids in the CAGM are the same as those used by Eagle (1959, *Science*, Vol. 130, pages 432–437) for cell and tissue cultures with the exception of the addition of taurine and ornithine which are constituents of fish blood. The amino acids are shown in table II below.

TABLE II

| | Essential Amino Acids | |
|---|---|---|
| | Concentration (mg/l) | |
| Compound | Limits | Preferred |
| L-arginine | 10–120 | 105 |
| L-cystine | 2–26 | 24 |
| L-histidine | 3–35 | 31 |
| L-isoleucine | 5–55 | 52 |
| L-leucine | 5–55 | 52 |
| L-lysine | 6–60 | 58 |
| L-methionine | 1–20 | 15 |
| L-phenylalanine | 3–35 | 32 |
| L-threonine | 5–50 | 48 |
| L-tryptophane | 1–12 | 10 |
| L-tyrosine | 3–40 | 36 |
| L-valine | 5–50 | 46 |
| Nonessential Amino Acids | | |
| | Concentration (mg/l) | |
| Compound | Limits | Preferred |
| L-alanine | 1–12 | 8.9 |
| L-asparagine | 1–15 | 13.2 |
| L-aspartic acid | 1–15 | 13.3 |
| glycine | 1–10 | 7.5 |
| L-glutamic acid | 1–20 | 14.7 |
| L-proline | 1–15 | 11.5 |
| L-serine | 1–15 | 10.5 |
| taurine | 3–35 | 31.0 |
| L-ornithine | 1–12 | 10.0 |

The vitamins present in the CAGM, the same as those used by Eagle, supra, for cell and tissue cultures, are shown in table III below.

TABLE III

| | Vitamins | |
|---|---|---|
| | Concentration (mg/l) | |
| Compound | Limits | Preferred |
| Choline chlorine | 0.1–2 | 1.0 |
| Folic acid | 0.1–2 | 1.0 |
| Inositol | 0.2–4 | 2.0 |
| Nicotinamide | 0.1–2 | 1.0 |
| Calcium pantohthenate | 0.1–2 | 1.0 |
| Pyridoxal | 0.1–2 | 1.0 |
| Riboflavin | 0.1–2 | 0.1 |
| Thiamine | 0.1–2 | 1.0 |

The remaining components in the artificial portion of the medium are shown in table IV below.

TABLE IV

| | Other Compounds | |
|---|---|---|
| | Concentration (mg/l) | |
| Compound | Limits | Preferred |
| Glucose | 100–1500 | 1000.0 |
| Phenol red (optional) | 1–15 | 10.0 |

The antibiotics and antimycotics used in the CAGM are listed in Table V below.

TABLE V

| Antibiotics and Antimycotic | |
|---|---|
| Compound | Concentration |
| Antibiotics | |
| Streptomycin sulfate | 800 μg/ml |
| Penicillin G. sodium | 800 U/ml |
| Oxytetracycline | 50 μ/ml |
| Antimycotic | |
| Amphotericin | 5 μg/ml |

The antibiotics and antimycotic concentrations noted in table V, supra, are the basic concentrations used in cell culture experiments. In our earlier experiments, it was determined that even four times or greater a concentration can be used to control infection. Also, in earlier experiments all the agents listed in table V were used in the concentrations noted in the basic medium except oxytetracycline which was only used to control bacterial infections when penicillin and streptomycin provided ineffective.

In later experiments we have found that carbenicillin 100 μg/L, gentamicin sulfate 100 μg/L, and rifampin 100 μg/L combine to control bacteria much better than antibiotics listed in table V above. A range of concentrations from control to 1000 μg/L were tested utilizing these antibiotics. They were all apparently toxic at higher concentrations above 500 μg/L. See antibiotics and antimycotic in table VI for new combinations.

TABLE VI

| Antibiotics and Antimycotic | |
|---|---|
| Compound | Concentration |
| Antibiotics | |
| Carbenicillin | 100 μg/ml |
| Gentamicin sulfate | 100 μg/ml |
| Rifampin | 100 μg/ml |
| Antimycotic | |
| Amphotericin B | 5 μg/ml |

The above components (tables I–V) are combined and 2.85 ml of 1.25 M NaOH added per 100 ml of CAGM solution to bring the pH up to the range of about 7.8 to about 8.0. All of the above solutions are pressure filtered through a standard 0.45 μm or less pore size membrane for final sterilization. A larger pore size will not retain all the bacteria and a smaller pore size makes filtration difficult; it clogs up prematurely. This complete artificial portion, or pH adjusted CAGM antibiotics and antimycotic, which is hereinafter referred to for the sake of convenience and conciseness as pH-CAGM-AA, is used as 66-⅔ percent of the total glochidial medium.

Whole fish plasma serves as a natural protein source in the glochidial medium. Fish blood is obtained by cardiac puncture of any number of freshwater fish including bass, catfish, carp, buffalo, and suckers, with a sterile syringe coated with sterile sodium heparin, in concentration of 1000 U/ml, and an 18-gauge needle. We have found that a larger size needle will pick up tissues and a smaller size needle tends to rupture red blood cells. The blood is centrifuged at 1000 rpm (approximately 100 relative centrifugal force) for 10 minutes followed at 3000 rpm (approximately 1000 RCF) for 10 minutes, in a refrigerated centrifuge, and the supernatant blood plasma and a few formed cellular elements, such as for example blood cells, are removed. The antibiotics and an antimycotic are added to the plasma in the same concentration as shown in table VI, supra. The plasma should be pressure filtered through at least a 0.45 μm or smaller pore size filter as described in the process below. This natural portion of the medium is used as 33-⅓ percent of the total glochidial medium.

The Invention Process

Following the selection of gravid mussels from their habitat, they should be transported to the laboratory site in water obtained from the immediate habitat area.

Upon receipt of the gravid mussels, a specimen is selected, the valves are pried open gently, and both the anterior and posterior adductor muscles are severed utilizing a sterilized knife blade or scapel. Gills containing glochidia are severed with sterile surgical type scissors and removed to a small beaker (250–500 ml) containing sterile deionized water. Use of deionized water is essential to prevent premature closure of the glochidia, i.e., if they sense the presence of certain ions in the water, for instance $Cl^-$, they close up prematurely. At this point, all washing and transfer work is conducted in a laminar airflow cabinet of the high-efficiency particulate air (HEPA) filter type. Standard bacteriological and/or tissue culture sterile techniques are adhered to in all processing and transfer of media and glochidia.

Glochidia are separated from the gill tissue to the extent practical. In some species the glochidia are in a mucoid or conglutinate mass. When fully mature, the glochidia should separate from this mass by agitation or gentle movement in the deionized water utilizing tweezers.

The glochidia are washed several times with sterile deionized water, utilizing the following simple procedure. Set up a standard glass filtering flask with a tube to fit a pasteur pipette. Attach a sterile pipette and vacuum the water from the glochidia. Add more water and swirl the glochidia gently; pour or vacuum water off again. Repeat this procedure several times to restore tissue debris, dead glochidia, bacteria, and protozoa. At this point, the glochidia are ready to be transferred to the complex media, supra.

Although it is not absolutely necessary, a quick check of glochidial condition and maturity can be accomplished as follows: transfer a few glochidia (up to 100) to 2–3 ml of artificial medium. The glochidia will exhibit almost immediate closure. Sixty to ninety percent or greater closure indicates that the glochidia are in good condition and/or mature.

All media should be tested bacteriologically the day prior to use by culture on nutrient-Agar. Check the bacteriological samples the day of use for positives. Filtration should be used to sterilize contaminated media, or make new media.

The growth medium is measured into tissue culture dishes of the following types: either the 60 mm wide by 15 mm deep, which are preferred, or 100 mm wide by 20 mm deep tissue culture dishes with surface treated for cell attachment and that are optically clear. Pipette 3 mls of media into the 60 mm wide dishes or 10 mls into the 100 mm wide dishes. Use a pasteur pipette to transfer from 200–500 glochidia into each dish. Glochidia are then transferred to an airflow $CO_2$ incubator. The $CO_2$ incubator is essential to control the pH between about 7.2 and 7.4 since a carbonate buffer system is present in the media. Twenty-three degrees Celsius should be used for incubation of the glochidia.

Although unfiltered blood plasma can be used, pressure filtered (0.45 μm) plasma is preferred, to wit, (0.45 μm followed by 0.20 μm). The culture media should be changed only if contamination develops, preferably by the use of a pasteur pipette attached to a vacuum source. After a protracted period, the length of which, of course, varies with certain conditions such as temperature as well as species of glochidia being transformed, the glochidia mature to the juvenile stage, after which some may be transferred back to natural habitat wherein same are allowed to further mature to adult mussels. Usually the protracted period for freshwater mussels ranges from about 14 to about 21 days.

INVENTION PARAMETERS

After sifting and winnowing through the data herein presented, as well as other results and operations of our novel process including the use of our new and novel compositions of matter utilized therein for ensuring the transformation of glochidia of freshwater mussels to the juvenile stage in artificial habitat, which processes and compositions of matter are eminently suited to ensure environmental integrity during the artificial and protracted cultural period and thereby effect significant commercial and conservation management relations, the operating variables and preferred conditions for carrying out our process wherein our new compositions of matter are utilized therein are summarized below.

| Variables | Range | Preferred |
|---|---|---|
| CAGM | | |
| Inorganic salts | Modified unionid Ringers fluid Table I, supra | Modified unionid Ringers fluid Table I, supra |
| Amino acids | Modified Eagles Table II, supra | Modified Eagles Table II, supra |
| Vitamins | Eagles Table III, supra | Eagles Table III, supra |
| Other compounds | | |
| Glucose, mg/L | 100–1500 | 1000 |
| Phenol red, mg/L | 1–15 | 10 |
| NaOH (sufficient to adjust pH) | 7.2–8.3 | 7.2–7.4[1] |
| Group A - from earlier work | | |
| Antibiotics/Antimycotics (final solution)[2] | | |

-continued

| Variables | Range | Preferred |
|---|---|---|
| Streptomycin sulfate, µg/ml | 400–2000 | 800 |
| Penicillin G, sodium salt U/ml | 400–2000 | 800 |
| Amphotericin B, µg/ml | 1–25 | 5 |
| Oxytetracycline, µg/ml | 50–300 | 50 |
| Total blood plasma, percent | | |
| Initial culture | 20–80 | 80 |
| Final culture | 0–80 | 20 |
| Group B - from later work | | |
| Antibiotics/Antimycotics (final solution)[2] | | |
| Carbenicillin, µg/ml | 100–500 | 100 |
| Gentamicin sulfate, U/ml | 100–500 | 100 |
| Rifampin, µg/ml | 100–500 | 100 |
| Amphotericin B, µg/ml | 1–25 | 5 |
| Total blood plasma, percent | | |
| Initial culture | 20–80 | About one-third |
| Final culture | 0–80 | About one-third |
| Total artificial medium, percent (pH-CAGM-AA) | | |
| Initial culture | 20–80 | About two-thirds |
| Final culture | 20–100 | About two-thirds |
| Incubator | | |
| Temperature, °C. | 18–28 | 23 |
| Rate filtered air to incubator l/hr | Sufficient to maintain pH range, supra | |
| Rate $CO_2$ to incubator, l/hr | Sufficient to maintain pH range, supra | |

[1]7.3 most preferred.
[2]In CAGM, supra, or blood plasma, infra, or both.

Fish blood plasma was necessary to stimulate development in all species tested. In earlier experiments the concentration of the plasma appeared to determine the rate of development as well as the number of glochidia developing. In the initial medium, 80 percent plasma was used with 20 percent artificial medium, i.e., pH-CAGM-AA. Test cultures were made varying the present plasma and artificial medium, respectively, as follows: 0:100; 10:90; 20:80; 40:60; 60:40; 80:20; 100:0. In the above cases, early development occurred most rapidly in the 80:20 experimental replicates with a decreasing rate of development down to 20:80. Development was infrequent in the 100:0, 10:90, and 0:100 dishes, with no live glochidia by the fourth day. In terms of yield, a test involving the same concentrations of plasma with six replicate cultures each, produced transformation only in the dishes with high plasma concentration. See table VII below.

TABLE VII

Number of Developing Glochidia in Six Repetitions of Cultures at Different Concentrations of Plasma

| Plasma concentration (in % of total medium) | Percent of glochidia closed at one day range and mean | (S$\bar{x}$) | Percent of closed showing advanced transformation; range and mean | (S$\bar{x}$) |
|---|---|---|---|---|
| 0 | 51.0–68.3, 50.1 | (2.3) | 0, 0 | (0) |
| 10 | 66.3–87.6, 77.7 | (3.6) | 0, 0 | (0) |
| 20 | 77.8–90.5, 84.7 | (2.0) | 0, 0 | (0) |
| 40 | 73.9–90.2, 85.2 | (2.5) | 0–7.1, 2.1 | (1.3) |
| 60 | 80.3–93.1, 87.2 | (1.8) | 19.4–62.1, 33.8 | (7.8) |
| 80 (only 3 reps) | 80.2–86.9, 83.3 | (2.0) | 44.6–57.8, 51.2 | (3.8) |

The 20–80 percent plasma allowed initial closure and development significantly higher than the 0 to 10 percent plasma concentrations. Additionally, the advanced transformation was best in 80 percent, decreasing in 60 and 40 percent and absent in 20 percent. However, in later experiments where the environment was better controlled and contamination was less, about one-third plasma was sufficient for the development of large numbers of glochidia. Results from experiments using higher percent plasma were not significantly different than those using about 33 percent plasma.

While we have shown and described particular embodiments of our invention, modifications and variations thereof will occur to those skilled in the art. We wish it to be understood, therefore, that the appended claims are intended to cover such modifications and variations which are within the true scope and spirit of our invention.

What we claim as new and desire to secute by Letters Patent of the United States is:

1. A process for the transformation of glochidia of freshwater mussels to the juvenile stage wherein the normal period of presumed host specific parasitism on fish is reproduced in an artificial habitat, which process comprises the steps of:
  (1) removing from gravid mussels the glochidia therein and transferring same into sterile deionized water wherefrom are removed the undesirable portions thereof including tissue debris, dead glochidia, bacteria, and protozoa;
  (2) removing at least a portion of the resulting decontaminated glochidia from said sterile deionized water and transferring same into a mixture of complex artificial growth medium and fish blood plasma, said complex artificial growth medium having an adjusted pH of about 7.8 to about 8.0 and said complex artifical growth medium and said fish blood plasma containing predetermined quantities of antibiotics and antimycotics, said mixture of artificial growth medium and blood plasma ranging from about 20 to about 80 percent and about 80 percent to about 20 percent, respectively; said predetermined quantities of antibiotics and antimycotics in said artificial growth medium and said blood serum ranging in concentrations therein as follows:

| Compound | Concentration |
|---|---|
| Antibiotics | |
| Streptomycin sulfate | 400–2000 µg/ml |
| Penicillin G. sodium salt | 400–2000 U/ml |
| Oxytetracycline | 50–300 µg/ml |
| Antimycotic | |
| Amphotericin B | 1–25 µg/ml | and said complex artificial growth medium comprising predetermined quantities of inorganic salts, amino acids, including essential amino acids and nonessential amino acids, vitamins, and other compounds including glucose as follows:

| Compound | Concentration, mg/l |
|---|---|
| Inorganic salts | |
| $CaCl_2$ | 600–1400 |
| $MgCl_2.6H_2O$ | 500–1200 |
| NaCl | 700–1700 |
| KCl | 50–125 |
| $NaHCO_3$ | 1100–2400 |
| Essential Amino Acids | |
| L-arginine | 10–120 |
| L-cystine | 2–26 |
| L-histidine | 3–35 |
| L-isoleucine | 5–55 |
| L-leucine | 5–55 |
| L-lysine | 6–60 |
| L-methionine | 1–20 |
| L-phenylalanine | 3–35 |
| L-threonine | 5–50 |
| L-tryptophane | 1–12 |
| L-tyrosine | 3–40 |
| L-valine | 5–50 |
| Nonessential Amino Acids | |
| L-alanine | 1–12 |
| L-asparagine | 1–15 |
| L-aspartic acid | 1–15 |
| glycine | 1–10 |
| L-glutamic acid | 1–20 |
| L-proline | 1–15 |
| L-serine | 1–15 |
| taurine | 3–35 |
| L-ornithine | 1–12 |
| Vitamins | |
| choline chlorine | 0.1–2 |
| folic acid | 0.1–2 |
| inositol | 0.2–4 |
| nicotinamide | 0.1–2 |
| calcium pantothenate | 0.1–2 |
| pyridoxal | 0.1–2 |
| riboflavin | 0.1–2 |
| thiamine | 0.1–2 |
| Other Compounds | |
| glucose | 100–1500 |
| phenol red - optional | 1–15 |

(3) subjecting said glochidia in said mixture of artificial complex growth medium and said blood plasma to incubation means wherein the temperature is maintained from about 18° C. to about 28° C. and wherein carbon dioxide enriched air is introduced and withdrawn in sufficient quantities to effectively control the pH in said mixture in the range from about 7.2 to about 8.3;

(4) subsequently and periodically removing from contact with said glochidia the resulting culture medium comprising said mixture of complex artificial growth medium and fish blood plasma and substituting therefor a quantity of fresh culture medium, the length of time between said periodic substitution of fresh culture medium ranging from about 1 day to about 3 days and the number of substitutions being sufficient to ensure the maturing of said glochidia to the juvenile stage; and (5) subsequently removing from said incubation means the resulting juvenile mussels and returning same to natural habitat.

2. The process of claim 1 wherein the initial culture medium subjected to said incubation means contains about 40 to 20 percent by weight complex artificial growth medium and about 60 percent to about 80 percent by weight blood plasma, wherein said culture medium proportions are adjusted during subsequent substitutions thereof in said incubation means such that the final concentration of said mixture ranges from about 80 to about 60 percent artificial complex growth medium and from about 20 to about 40 percent blood plasma.

3. The process of claim 1 wherein the initial culture medium subjected to said incubation means contains about 20 percent by weight complex artificial growth medium and about 80 percent by weight blood plasma, wherein said culture medium proportions are adjusted during subsequent substitutions thereof in said incubation means such that the final concentration of said mixture contains about 80 percent artificial complex growth medium and about 20 percent blood plasma.

4. The process of claim 1 wherein the inorganic salts, amino acids, vitamins, and other compounds in said artificial growth medium are as follows:

| Compound | Concentration, mg/l |
|---|---|
| Inorganic Salts | |
| $CaCl_2$ | 1200 |
| $MgCl_2.6H_2O$ | 1000 |
| NaCl | 1530 |
| KCl | 99 |
| $NaHCO_3$ | 2200 |
| Essential Amino Acids | |
| L-arginine | 105 |
| L-cystine | 24 |
| L-histidine | 31 |
| L-isoleucine | 52 |
| L-leucine | 52 |
| L-lysine | 58 |
| L-methionine | 15 |
| L-phenylalanine | 32 |
| L-threonine | 48 |
| L-tryptophane | 10 |
| L-tyrosine | 36 |
| L-valine | 46 |
| Nonessential Amino Acids | |
| L-alanine | 8.9 |
| L-asparagine | 13.2 |
| L-aspartic acid | 13.3 |
| glycine | 7.5 |
| L-glutamic acid | 14.7 |
| L-proline | 11.5 |
| L-serine | 10.5 |
| taurine | 31.0 |
| L-ornithine | 10.0 |
| Vitamins | |
| choline chlorine | 1.0 |
| folic acid | 1.0 |
| inositol | 2.0 |
| nicotinamide | 1.0 |
| calcium pantothenate | 1.0 |
| pyridoxal | 1.0 |
| riboflavin | 0.1 |
| thiamine | 1.0 |
| Other Compounds | |
| glucose | 1000.0 |
| phenol red - optional | 10.0 |

5. The process of claim 4 wherein the initial culture medium subjected to said incubation means contains about 40 to about 20 percent by weight complex artificial growth medium and about 60 to about 80 percent by weight fish blood plasma, wherein said culture medium proportions are adjusted during subsequent substitutions thereof in said incubation means such that the final concentration of said mixture ranges from about 80 to about 60 percent artificial complex growth medium and from about 20 to about 40 percent blood plasma.

6. The process of claim 4 wherein the initial culture medium subjected to said incubation means contains about 20 percent by weight complex artificial growth medium and about 80 percent by weight fish blood plasma, wherein said culture medium proportions are adjusted during subsequent substitutions thereon in said incubation means such that the final concentration of said mixture contains about 80 percent artificial complex growth medium and about 20 percent blood plasma.

7. The process of claims 1, 2, 3, 4, 5, or 6 wherein the temperature in said incubation means is maintained at about 23° C. and wherein the pH of the culture medium therein is maintained in the range of about 7.2 to about 7.4.

8. A new composition of matter eminently suitable for effecting transformation of glochidia of freshwater mussels to the juvenile stage wherein the normal period of host specific parasitism on fish is reproduced in an artificial habitat, said composition of matter comprising a mixture of complex artificial growth medium and fish blood plasma, said complex artificial growth medium having an adjusted pH of about 7.8 to about 8.0 and said complex artificial growth medium and said blood plasma containing predetermined quantities of antibiotics and antimycotics, said mixture of artificial growth medium and blood plasma ranging from about 20 to about 80 percent and about 80 percent to about 20 percent, respectively; said predetermined quantities of antibiotics and antimycotics in said artificial growth medium and said blood plasma ranging in concentrations therein as follows:

| Compound | Concentration |
|---|---|
| Antibiotics | |
| Streptomycin sulfate | 800–3200 μg/ml |
| Penicillin G. sodium salt | 800–3200 U/ml |
| Oxytetracycline | 50–200 μg/ml |
| Antimycotic | |
| Amphotericin B | 5–20 μg/ml | and said complex artificial growth medium comprising predetermined quantities in inorganic salts, amino acids, including essential amino acids and nonessential amino acids, vitamins, and other compounds including glucose as follows:

| Compound | Concentration, mg/l |
|---|---|
| Inorganic Salts | |
| CaCl₂ | 600–1400 |
| MgCl₂.6H₂O | 500–1200 |
| NaCl | 700–1700 |
| KCl | 50–125 |
| NaHCO₃ | 1100–2400 |
| Essential Amino Acids | |
| L-arginine | 10–120 |
| L-cystine | 2–26 |
| L-histidine | 3–35 |
| L-isoleucine | 5–55 |
| L-leucine | 5–55 |
| L-lysine | 6–60 |
| L-methionine | 1–20 |
| L-phenylalanine | 3–35 |
| L-threonine | 5–50 |
| L-tryptophane | 1–12 |
| L-tyrosine | 3–40 |
| L-valine | 5–50 |
| Nonessential Amino Acids | |
| L-alanine | 1–12 |
| L-asparagine | 1–15 |
| L-aspartic acid | 1–15 |
| glycine | 1–10 |
| L-glutamic acid | 1–20 |
| L-proline | 1–15 |
| L-serine | 1–15 |
| taurine | 3–35 |
| L-ornithine | 1–12 |
| Vitamins | |
| choline chlorine | 0.1–2 |
| folic acid | 0.1–2 |
| inositol | 0.2–4 |
| nicotinamide | 0.1–2 |
| calcium pantothenate | 0.1–2 |
| pyridoxal | 0.1–2 |
| riboflavin | 0.1–2 |
| thiamine | 0.1–2 |
| Other Compounds | |
| glucose | 100–1500 |
| phenol red, optional | 1–15 |

9. The new composition of matter of claim 8 wherein said complex artificial growth medium comprising predetermined quantities of inorganic salts, amino acid including essential amino acids and nonessential amino acids, vitamins, and other compounds including glucose, is as follows:

| Compound | Concentration, mg/l |
|---|---|
| Inorganic Salts | |
| CaCl₂ | 1200 |
| MgCl₂.6H₂O | 1000 |
| NaCl | 1530 |
| KCl | 99 |
| NaHCO₃ | 2200 |
| Essential Amino Acids | |
| L-arginine | 105 |
| L-cystine | 24 |
| L-histidine | 31 |
| L-isoleucine | 52 |
| L-leucine | 52 |
| L-lysine | 58 |
| L-methionine | 15 |
| L-phenylalanine | 32 |
| L-threonine | 48 |
| L-tryptophane | 10 |
| L-tyrosine | 36 |
| L-valine | 46 |
| Nonessential Amino Acids | |
| L-alanine | 8.9 |
| L-asparagine | 13.2 |
| L-aspartic acid | 13.3 |
| glysine | 7.5 |
| L-glutamic acid | 14.7 |
| L-proline | 11.5 |
| L-serine | 10.5 |
| taurine | 31.0 |
| L-ornithine | 10.0 |
| Vitamins | |
| choline chlorine | 1.0 |
| folic acid | 1.0 |
| inositol | 2.0 |
| nicotinamide | 1.0 |
| calcium pantothenate | 1.0 |
| pyridoxal | 1.0 |
| riboflavin | 0.1 |

| Compound | Concentration, mg/l |
|---|---|
| thiamine | 1.0 |
| Other Compounds | |
| glucose | 1000.0 |
| phenol red, optional | 10.0 |

10. A process for the transformation of glochidia of freshwater mussels to the juvenile stage wherein the normal period of presumed host specific parasitism on fish is reproduced in an artificial habitat, which process comprises the steps of:
(1) removing from gravid mussels the glochidia therein and transferring same into sterile deionized water wherefrom are removed the undesirable portions thereof including tissue debris, dead glochidia, bacteria, and protozoa;
(2) removing at least a portion of the resulting decontaminated glochidia from said sterile deionized water and transferring same into a mixture of complex artificial growth medium and fish blood plasma, said complex artificial growth medium having an adjusted pH of about 7.8 to about 8.0 and said complex artificial growth medium and said fish blood plasma containing predetermined quantities of antibiotics and antimycotics, said mixture of artificial growth medium and blood plasma ranging from about 20 to about 80 percent and about 80 percent to about 20 percent, respectively; said predetermined quantities of antibioticsantimycotics in said artificial growth and said blood plasma ranging in concentrations therein as follows:

| Compound | Concentration |
|---|---|
| Antibiotics | |
| Carbenicillin | 100–500 μg/ml |
| Gentamicin sulfate | 100–500 μg/ml |
| Rifampin | 100–500 μg/ml |
| Antimycotic | |
| Amphotericin B | 1–25 μg/ml | and said complex artificial growth medium comprising predetermined quantities of inorganic salts, amino acids, including essential amino acids and nonessential amino acids, vitamins, and other compounds including glucose as follows:

| Compound | Concentration, mg/l |
|---|---|
| Inorganic Salts | |
| $CaCl_2$ | 600–1400 |
| $MgCl_2.6H_2O$ | 500–1200 |
| NaCl | 700–1700 |
| KCl | 50–125 |
| $NaHCO_3$ | 1100–2400 |
| Essential Amino Acids | |
| L-arginine | 10–120 |
| L-cystine | 2–26 |
| L-histidine | 3–35 |
| L-isoleucine | 5–55 |
| L-leucine | 5–55 |
| L-lysine | 6–60 |
| L-methionine | 1–20 |
| L-phenylalanine | 3–35 |
| L-threonine | 5–50 |
| L-tryptophane | 1–12 |
| L-tyrosine | 3–40 |
| L-valine | 5–50 |
| Nonessential Amino Acids | |
| L-alanine | 1–12 |
| L-asparagine | 1–15 |
| L-aspartic acid | 1–15 |
| glycine | 1–10 |
| L-glutamic acid | 1–20 |
| L-proline | 1–15 |
| L-serine | 1–15 |
| taurine | 3–35 |
| L-ornithine | 1–12 |
| Vitamins | |
| choline chlorine | 0.1–2 |
| folic acid | 0.1–2 |
| inositol | 0.2–4 |
| nicotinamide | 0.1–2 |
| calcium pantothenate | 0.1–2 |
| pyridoxal | 0.1–2 |
| riboflavin | 0.1–2 |
| thiamine | 0.1–2 |
| Other Compounds | |
| glucose | 100–1500 |
| phenol red, optional | 1–15 |

(3) subjecting said glochidia in said mixture of artificial complex growth medium and said blood plasma to incubation means wherein the temperature is maintained from about 18° C. to about 28° C. and wherein carbon dioxide enriched air is introduced and withdrawn in sufficient quantities to effectively control the pH in said mixture in the range from about 7.2 to about 8.3 for a time sufficient to ensure the maturing of said glochidia to the juvenile stage; and
(4) subsequently removing from said incubation means the resulting juvenile mussels and returning same to natural habitat.

11. The process of claim 10 wherein the initial culture medium subjected to said incubation means contains about 40 to 20 percent by weight complex artificial growth medium and about 60 percent to about 80 percent by weight blood plasma, wherein said culture medium proportions are adjusted during subsequent substitutions thereof in said incubation means such that the final concentration of said mixture ranges from about 80 to about 60 percent artificial complex growth medium from about 20 to about 40 percent blood plasma.

12. The process of claim 10 wherein the culture medium subjected to said incubation means contains about one-third of its weight as blood plasma and about two-thirds of its weight as complex artificial growth medium.

13. The process of claim 10 wherein the inorganic salts, amino acids, vitamins, and other compounds in said artificial growth medium are as follows:

| Compound | Concentration, mg/l |
|---|---|
| Inorganic Salts | |
| $CaCl_2$ | 1200 |
| $MgCl_2.6H_2O$ | 1000 |
| NaCl | 1530 |
| KCl | 99 |
| $NaHCO_3$ | 2200 |
| Essential Amino Acids | |
| L-arginine | 105 |
| L-cystine | 24 |
| L-histidine | 31 |
| L-isoleucine | 52 |
| L-leucine | 52 |
| L-lysine | 58 |
| L-methionine | 15 |
| L-phenylalanine | 32 |

-continued

| Compound | Concentration, mg/l |
|---|---|
| L-threonine | 48 |
| L-tryptophane | 10 |
| L-tyrosine | 36 |
| L-valine | 46 |
| Nonessential Amino Acids | |
| L-alanine | 8.9 |
| L-asparagine | 13.2 |
| L-aspartic acid | 13.3 |
| glycine | 7.5 |
| L-glutamic acid | 14.7 |
| L-proline | 11.5 |
| L-serine | 10.5 |
| taurine | 31.0 |
| L-ornithine | 10.0 |
| Vitamins | |
| choline chlorine | 1.0 |
| folic acid | 1.0 |
| inositol | 2.0 |
| Nicotinamide | 1.0 |
| calcium pantothenate | 1.0 |
| pyridoxal | 1.0 |
| riboflavin | 0.1 |
| thiamine | 1.0 |
| Other Compounds | |
| glucose | 1000.0 |
| phenol red, optional | 10.0 |

14. The process of claim 13 wherein the initial culture medium subjected to said incubation means contains about 40 to about 20 percent by weight complex artificial growth medium and about 60 to about 80 percent by weight fish blood plasma, wherein said culture medium proportions are adjusted during subsequent substitutions thereof in said incubation means such that the final concentration of said mixture ranges from about 80 to about 60 percent artificial complex growth medium and from about 20 to about 40 percent blood plasma.

15. The process of claim 13 wherein the culture medium subjected to said incubation means contains about one-third of its weight as blood plasma and about two-thirds of its weight as complex artificial growth medium.

16. The processes of claims 10, 11, 12, 13, 14, or 15 wherein the temperature in said incubation means is maintained at about 23° C. and wherein the pH of the culture medium therein is maintained in the range of about 7.2 to about 7.4.

17. A new composition of matter eminently suitable for effecting transformation of glochidia of freshwater mussels to the juvenile stage wherein the normal period of host specific parasitism on fish is reproduced in an artificial habitat, said composition of matter comprising a mixture of complex artificial growth medium and fish blood plasma, said complex artificial growth medium having an adjusted pH of about 7.8 to about 8.0 and said complex artificial growth medium and said blood plasma containing predetermined quantities of antibiotics and antimycotics, said mixture of artificial growth medium and blood plasma ranging from about 20 to about 80 percent and about 80 percent to about 20 percent, respectively; said predetermined quantities of antibiotics and antimycotics in said artificial growth medium and said blood plasma ranging in concentrations therein as follows:

| Compound | Concentration |
|---|---|
| Antibiotics | |
| Carbenicillin | 100–500 μg/ml |
| Gentamicin sulfate | 100–500 μg/ml |
| Rifampin | 100–500 μg/ml |
| Antimycotic | |
| Amphotericin B | 1–25 μg/ml | and said complex artificial growth medium comprising predetermined quantities of inorganic salts, amino acids, including essential amino acids and nonessential amino acids, vitamins, and other compounds including glucose as follows:

| Compound | Concentration, mg/l |
|---|---|
| Inorganic Salts | |
| CaCl$_2$ | 600–1400 |
| MgCl$_2$.6H$_2$O | 500–1200 |
| NaCl | 700–1700 |
| KCl | 50–125 |
| NaHCO$_3$ | 1100–2400 |
| Essential Amino Acids | |
| L-arginine | 10–120 |
| L-cystine | 2–26 |
| L-histidine | 3–35 |
| L-isoleucine | 5–55 |
| L-leucine | 5–55 |
| L-lysine | 6–60 |
| L-methionine | 1–20 |
| L-phenylalanine | 3–35 |
| L-threonine | 5–50 |
| L-tryptophane | 1–12 |
| L-tyrosine | 3–40 |
| L-valine | 5–50 |
| Nonessential Amino Acids | |
| L-alanine | 1–12 |
| L-asparagine | 1–15 |
| L-aspartic acid | 1–15 |
| glycine | 1–10 |
| L-glutamic acid | 1–20 |
| L-proline | 1–15 |
| L-serine | 1–15 |
| taurine | 3–35 |
| L-ornithine | 1–12 |
| Vitamins | |
| choline chlorine | 0.1–2 |
| folic acid | 0.1–2 |
| inositol | 0.2–4 |
| nicotinamide | 0.1–2 |
| calcium pantothenate | 0.1–2 |
| pyridoxal | 0.1–2 |
| riboflavin | 0.1–2 |
| thiamine | 0.1–2 |
| Other Compounds | |
| glucose | 100–1500 |
| phenol red, optional | 1–15 |

18. The new composition of matter of claim 17 wherein said complex artificial growth medium comprising predetermined quantities of inorganic salts, amino acids including essential amino acids and nonessential amino acids, vitamins, and other compounds including glucose is as follows:

| Compound | Concentration, mg/l |
|---|---|
| Inorganic Salts | |
| CaCl$_2$ | 1200 |
| MgCl$_2$.6H$_2$O | 1000 |
| NaCl | 1530 |
| KCl | 99 |
| NaHCO$_3$ | 2200 |
| Essential Amino Acids | |
| L-arginine | 105 |
| L-cystine | 24 |

-continued

| Compound | Concentration, mg/l |
|---|---|
| L-histidine | 31 |
| L-isoleucine | 52 |
| L-leucine | 52 |
| L-lysine | 58 |
| L-methionine | 15 |
| L-phenylalanine | 32 |
| L-threonine | 48 |
| L-tryptophane | 10 |
| L-tyrosine | 36 |
| L-valine | 46 |
| Nonessential Amino Acids | |
| L-alanine | 8.9 |
| L-asparagine | 13.2 |
| L-aspartic acid | 13.3 |
| glysine | 7.5 |

-continued

| Compound | Concentration, mg/l |
|---|---|
| L-glutamic acid | 14.7 |
| L-proline | 11.5 |
| L-serine | 10.5 |
| taurine | 31.0 |
| L-ornithine | 10.0 |
| Vitamins | |
| choline chlorine | 1.0 |
| folic acid | 1.0 |
| inositol | 2.0 |
| nicotinamide | 1.0 |
| calcium pantothenate | 1.0 |
| pyridoxal | 1.0 |
| riboflavin | 0.1 |
| thiamine | 1.0 |
| Other Compounds | |
| glucose | 1000.0 |
| phenol red, optional | 10.0 |

* * * * *

UNITED STATES PATENT AND TRADEMARK OFFICE
CERTIFICATE OF CORRECTION

PATENT NO. : 4,449,480

DATED : May 22, 1984

INVENTOR(S) : Billy G. Isom and Robert G. Hudson

It is certified that error appears in the above-identified patent and that said Letters Patent are hereby corrected as shown below:

Cover sheet, item 75, the name "Ison" should be -- Isom --

Cover sheet, item 63, third line, after "1981" delete "abandoned" and insert -- now Defensive Publication No. T102,602 --

Column 1, line 10, after "1982" insert - - abandoned -- line 12, after "1981" delete "both now abandoned," and insert -- now Defensive Publication No. T102,602 --

Column 4, line 31, change "provided" to -- proved --

Signed and Sealed this

Thirtieth Day of October 1984

[SEAL]

Attest:

GERALD J. MOSSINGHOFF

Attesting Officer

Commissioner of Patents and Trademarks